(12) United States Patent
Kang et al.

(10) Patent No.: US 9,680,632 B2
(45) Date of Patent: Jun. 13, 2017

(54) SYSTEMS AND METHODS FOR SYMBOL TIME TRACKING

(71) Applicant: QUALCOMM Incorporated, San Diego, CA (US)

(72) Inventors: Eunmo Kang, San Diego, CA (US); Mahbod Mofidi, San Diego, CA (US); Paul DenBoer, Escondido, CA (US); Xiao Deng, San Diego, CA (US); Ashish Subhash Banthia, San Diego, CA (US); Vincent So, San Diego, CA (US); Vikram Meka, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/863,082

(22) Filed: Sep. 23, 2015

(65) Prior Publication Data
US 2016/0241382 A1    Aug. 18, 2016

Related U.S. Application Data

(60) Provisional application No. 62/115,619, filed on Feb. 12, 2015.

(51) Int. Cl.
*H04L 7/00*   (2006.01)
*H04L 7/10*   (2006.01)
*H04B 5/00*   (2006.01)

(52) U.S. Cl.
CPC ............ *H04L 7/0087* (2013.01); *H04L 7/00* (2013.01); *H04L 7/0037* (2013.01); *H04B 5/00* (2013.01); *H04L 7/10* (2013.01)

(58) Field of Classification Search
CPC ....... H04L 7/00; H04L 7/0008; H04L 7/0037; H04L 7/0054; H04L 7/0079;
(Continued)

(56) References Cited

U.S. PATENT DOCUMENTS 5,680,422 A * 10/1997 Burch ................. H04J 3/073
                                                        370/505
5,854,605 A * 12/1998 Gildea ............... G01S 19/235
                                                        342/352

(Continued)

OTHER PUBLICATIONS

Chan, C.F., et al., "A Low-Power Continuously-Calibrated Clock Recovery Circuit for UHF RFID EPC Class-1 Generation-2 Transponders," IEEE Journal of Solid-State Circuits, IEEE Service Center, Piscataway, NJ, USA, vol. 45, No. 3, Mar. 1, 2010 (Mar. 1, 2010), pp. 587-599, XP011303478, Issn:.

(Continued)

*Primary Examiner* — Young T Tse
(74) *Attorney, Agent, or Firm* — Austin Rapp & Hardman, P.C.

(57) ABSTRACT

A method for communications is described. The method includes determining a symbol timing drift elimination amount for a received signal. The method further includes eliminating part of the symbol timing drift by adjusting a reference clock for the modem. Determining the symbol timing drift elimination amount may be based on at least one of a symbol timing drift estimate, a symbol timing error, a packet acquisition indicator, a packet validity indicator, demodulated bits or a carrier presence indicator.

20 Claims, 8 Drawing Sheets

(58) Field of Classification Search
CPC ....... H04L 7/0087; H04L 7/027; H04L 7/033;
H04L 7/0331; H04L 7/10; H04B 1/38;
H04B 1/40; H04B 5/00; H04B 5/0025;
H04B 5/02
USPC ....... 375/326, 327, 354, 355, 371, 373, 376;
713/400, 500, 600, 601
See application file for complete search history.

(56) References Cited

U.S. PATENT DOCUMENTS

| | | | | |
|---|---|---|---|---|
| 8,396,175 | B2* | 3/2013 | Flury | H04L 7/0054 375/220 |
| 2003/0076911 | A1* | 4/2003 | Kobayashi | H04J 3/07 375/372 |
| 2005/0040974 | A1 | 2/2005 | Shanks et al. | |
| 2005/0163202 | A1* | 7/2005 | Hampel | H04L 7/0004 375/219 |
| 2008/0129505 | A1 | 6/2008 | Lin et al. | |
| 2009/0031091 | A1* | 1/2009 | Chang | G06F 13/1689 711/154 |
| 2009/0052599 | A1* | 2/2009 | Yanagisawa | G09G 5/008 375/354 |
| 2010/0197349 | A1 | 8/2010 | Morita et al. | |
| 2010/0239057 | A1* | 9/2010 | Chang | H03L 7/00 375/349 |
| 2011/0206142 | A1 | 8/2011 | Sung | |
| 2012/0023363 | A1* | 1/2012 | Shaeffer | G06F 13/1689 714/6.11 |
| 2015/0063517 | A1* | 3/2015 | Verlinden | H04L 7/0079 375/376 |

OTHER PUBLICATIONS

International Search Report and Written Opinion—PCT/US2016/016995—ISA/EPO—Apr. 29, 2016.
Liang L.W., et al., "A Self-Calibrating NFC SoC with a Triple-Mode Reconfigurable PLL and a Single-Path PICC-PCD Receiver in 0.11 [mu]m", IEEE International Solid State Circuits Conference, IEEE Service Center, New York, NY, US, Feb. 9, 2014, XP032574988, pp. 158-159.

* cited by examiner

SYSTEMS AND METHODS FOR SYMBOL TIME TRACKING

RELATED APPLICATIONS

This application is related to and claims priority from U.S. Provisional Patent Application Ser. No. 62/115,619, filed Feb. 12, 2015, for "SYMBOL TIME TRACKING THROUGH CLOCK MANIPULATION."

TECHNICAL FIELD

The described technology generally relates to an apparatus and method of wireless communication. More particularly, the technology relates to symbol time tracking through clock manipulation.

BACKGROUND

The wireless communication environment in a home or an office generally includes a number of independently developed radio access technologies and standards. These technologies were initially designed for target applications and they perform relatively well for these applications. In a typical home or office environment, an access to content (e.g., web, video, etc.) is provided to a broadband modem through the home-owner's IP backhaul connection. For instance, mobile services are provided through the cellular network, through either a macro cell or a femto cell located within the home or office. Wireless local area network (WLAN) access points (APs) provide data connectivity between computers, cell phones, laptops, printers, and other wireless stations using 802.11-based Wi-Fi technology.

Another communication medium currently being implemented in electronic equipment is near-field communication (NFC). The use of NFC interfaces in electronic equipment provides portable devices with functions similar to those of non-contact integrated circuit cards (e.g., radio frequency identification (RFID) cards). In addition, electronic equipment provided with NFC interfaces is typically capable of operating as radio frequency (RF) readers and/or writers to communicate with other NFC devices. A basic aspect of NFC is the use of electromagnetic waves in an RF range and the transmission of information contents is realized over a short distance only, for instance, in a range of about several centimeters.

A wireless communication device may use a reference clock to demodulate data received from a remote device. If the signal received from the remote device experiences symbol timing drift, the wireless communication device may not be able to demodulate the data correctly. Benefits may be realized by performing symbol time tracking through clock manipulation.

SUMMARY

A method for communications is described. The method includes determining a symbol timing drift elimination amount for a received signal. The method also includes eliminating part of the symbol timing drift by adjusting a reference clock for a modem.

Determining the symbol timing drift elimination amount may be based on at least one of a symbol timing drift estimate, a symbol timing error, a packet acquisition indicator, a packet validity indicator, demodulated bits or a carrier presence indicator. Determining the symbol timing drift elimination amount may include trying different amounts of symbol timing drift elimination until packets are acquired and demodulated without an error.

The method may also include determining a symbol timing drift estimate of the received signal. The symbol timing drift estimate may be determined to be greater than a tolerable amount for a time tracking block of the modem. The symbol timing drift elimination amount may be set based on the symbol timing drift estimate.

Eliminating part of the symbol timing drift may include increasing or decreasing the reference clock by a fixed frequency or a fixed ratio. Eliminating part of the symbol timing drift may include periodically enabling and disabling clock division or multiplication for the reference clock. Adjusting the reference clock for the modem may be performed in an analog block of a receiver.

The method may be performed by a near-field communication (NFC) device. A reference for the reference clock may be obtained from a field transmitted by a remote NFC device.

A wireless communication device is also described. The wireless communication device includes a processor, a memory in communication with the processor, and instructions stored in the memory. The instructions are executable by the processor to determine a symbol timing drift elimination amount for a received signal. The instructions are also executable to eliminate part of the symbol timing drift by adjusting a reference clock for a modem.

A computer-program product for communications is also described. The computer-program product includes a non-transitory computer-readable medium having instructions thereon. The instructions include code for causing a wireless communication device to determine a symbol timing drift elimination amount for a received signal. The instructions also include code for causing the wireless communication device to eliminate part of the symbol timing drift by adjusting a reference clock for a modem.

DETAILED DESCRIPTION

Figure 1:
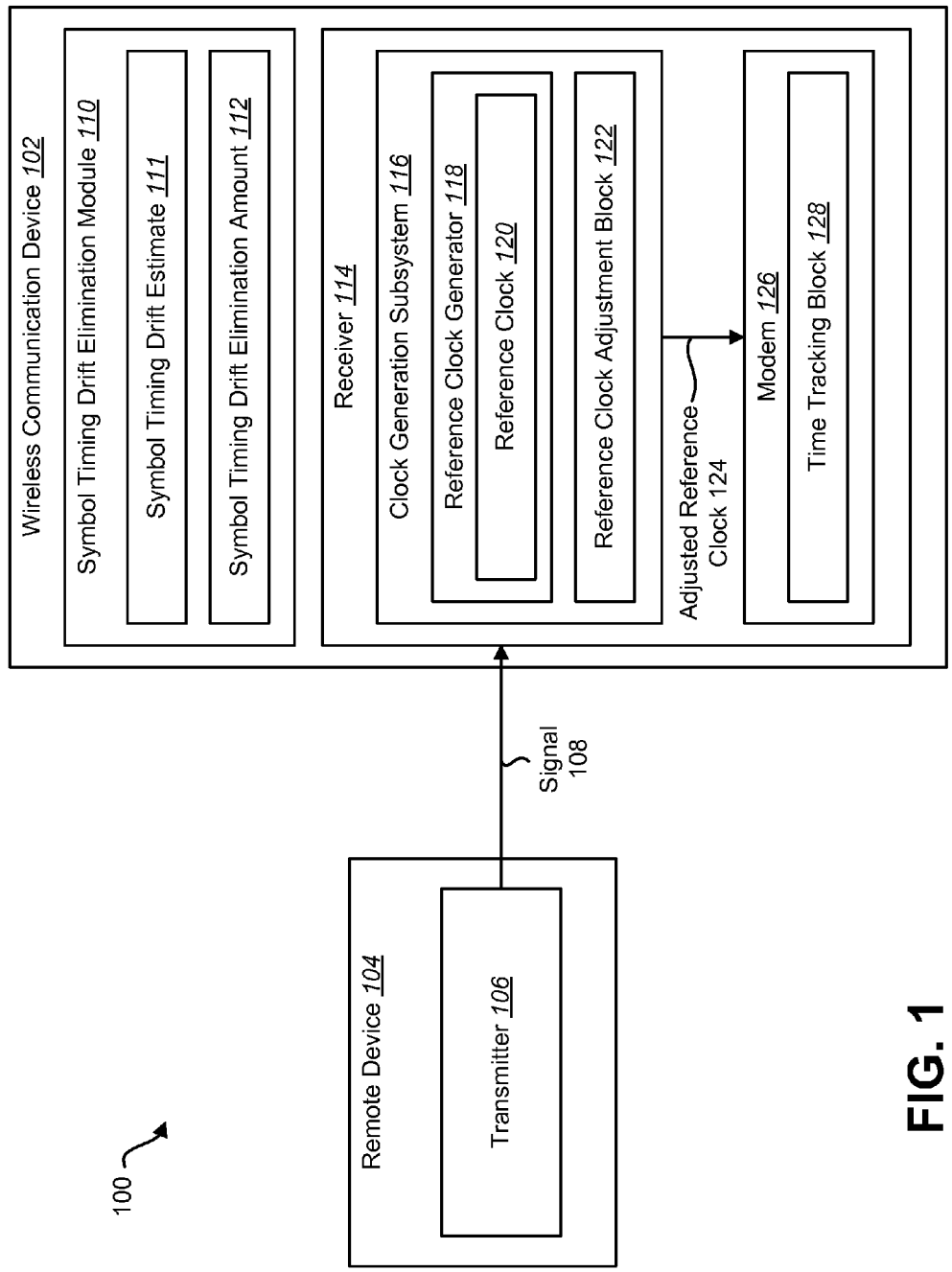
FIG. 1 is a block diagram illustrating one configuration of a wireless communication system for symbol time tracking through clock manipulation.

A receiver of a wireless communication device may contain a time tracking block that enables the receiver to track drifting symbol timing caused by a mismatch between a remote transmitter clock and a receiver clock. The time tracking block may be implemented in a hardware form rather than a software form because of high computational complexity and stringent latency requirement. The time tracking block may satisfy performance requirements on a tolerable amount of symbol timing drift. The tolerable amount of symbol timing drift may be based on standards and the behavior of remote transmitters in the market.

In some scenarios, a wireless communication device may encounter a non-standard remote transmitter that fails to interoperate with the wireless communication device receiver. This may be due to the remote transmitter causing a severe symbol timing drift beyond the capability of the time tracking block. This problem may be especially prevalent in a field of communication technologies where a large number of products are in the market and proprietary air interface or protocols are widely used.

The systems and methods described herein may eliminate some or all of the symbol timing drift by manipulating the reference clock for a digital modem. In one aspect of the described systems and methods, the wireless communication device may determine whether the symbol timing drift is greater than the amount of symbol timing drift that the time tracking block can handle. In another aspect of the described systems and methods, the wireless communication device may eliminate part of or all of the symbol timing drift by adjusting a reference clock for the modem.

The detailed description set forth below in connection with the appended drawings is intended as a description of exemplary implementations of the disclosure and is not intended to represent the only implementations in which the disclosure may be practiced. The term "exemplary" used throughout this description means "serving as an example, instance, or illustration," and should not necessarily be construed as preferred or advantageous over other exemplary implementations. The detailed description includes specific details for the purpose of providing a thorough understanding of the exemplary implementations of the disclosure. In some instances, some devices are shown in block diagram form.

While for purposes of simplicity of explanation, the methodologies are shown and described as a series of acts, it is to be understood and appreciated that the methodologies are not limited by the order of acts, as some acts may, in accordance with one or more aspects, occur in different orders and/or concurrently with other acts from those shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

Various configurations are now described with reference to the Figures, where like reference numbers may indicate functionally similar elements. The systems and methods as generally described and illustrated in the Figures herein could be arranged and designed in a wide variety of different configurations. Thus, the following more detailed description of several configurations, as represented in the Figures, is not intended to limit scope, as claimed, but is merely representative of the systems and methods.

FIG. 1 is a block diagram illustrating one configuration of a wireless communication system 100 for symbol time tracking through clock manipulation. The wireless communication system 100 may include a wireless communication device 102 that is in communication with a remote device 104. In one configuration, the wireless communication device 102 and the remote device 104 may communicate using inductively coupled communication.

In one implementation of inductively coupled communication, the wireless communication device 102 and the remote device 104 may use near-field communication (NFC). In the context of near-field communications, there are two devices communicating: an initiator and a target. The antenna of an initiator NFC device produces a radiated field (also referred to as a magnetic field or an electromagnetic field) that is received by the antenna of the target NFC device. The initiator NFC device may also be referred to as a poller, polling device or initiator. The target NFC device may also be referred to as a listener, listening device or target.

In one implementation, the remote device 104 may be an initiator NFC device and the wireless communication device 102 may be a target NFC device. The remote device 104 (e.g., the initiator NFC device) has a transmitter 106 and a receiver (for the sake of clarity, the receiver of the remote device 104 is not shown in FIG. 1). The wireless communication device 102 (e.g., the target NFC device) also has a transmitter and a receiver 114 (for the sake of clarity, the transmitter of the wireless communication device 102 is not shown in FIG. 1).

The remote device 104 and the wireless communication device 102 may use one or more NFC signaling technologies to communicate with each other. The NFC signaling technologies may include NFC type-A, NFC type-B and NFC type-F. The NFC signaling technologies differ in the modulation schemes employed.

NFC has four different tag types, which support a subset of the NFC signaling technologies. Type 1 tags (T1T) use NFC type-A communication without data collision protection. Type 2 tags (T2T) use NFC type-B communication with anti-collision. Type 3 tags (T3T) use NFC type-F with anti-collision. Type 4 tags (T4T) can use either NFC type-A (T4AT) or NFC type-B (T4BT) with anti-collision.

In one configuration, the remote device 104 and the wireless communication device 102 may be operable to communicate using NFC through various interfaces, such as a frame radio frequency (RF) interface, ISO-data exchange protocol (DEP) RF interface and NFC-DEP RF interface. In another configuration, the remote device 104 and the wireless communication device 102 may establish an NFC-DEP RF protocol-based communication link with link layer connections defined through a logical link control protocol (LLCP). In still another configuration, the remote device 104 and the wireless communication device 102 may be operable to be connected to an access network and/or core network (e.g., a CDMA network, a GPRS network, a UMTS network, and other types of wireline and wireless communication networks).

The remote device 104 may poll for nearby NFC devices. The wireless communication device 102 may begin to listen when it comes within a few centimeters of the remote device 104. The remote device 104 will then communicate with the wireless communication device 102 in order to determine which signaling technologies can be used. In one case, the remote device 104 may be acting as a reader. In one example, a user may place a wireless communication device 102 in the vicinity of the remote device 104 to initiate a payment transaction.

The remote device 104 may generate an RF field to communicate with the wireless communication device 102. The remote device 104 may modulate the RF field to send a signal 108 (e.g., data) to the wireless communication device 102. Once the wireless communication device 102 receives that signal 108, the remote device 104 may transmit a continuous wave to maintain the RF field. The continuous wave may have a carrier frequency. In the case of NFC, the carrier frequency may be 13.56 megahertz (MHz).

The wireless communication device 102 may receive the RF field. The wireless communication device 102 may respond by performing modulation on top of the continuous wave. The remote device 104 may receive the modulated signal 108 and may try to decode it.

The signal 108 from the remote device 104 may include symbols. The symbol timing may be based on a clock. In communication systems (e.g., radio or other wireless systems), the transmitter and the receiver frequently do not have access to a common clock source. Instead, there may be two clocks running separately, one at the transmitter 106 and another at the receiver 114.

A mismatch between the transmitter clock and the receiver clock may result in symbol timing drift. One consequence of having different clocks at the transmitter 106 and at the receiver 114 is that the transmitter and receiver symbol timings may drift over time even when the transmitter 106 and the receiver 114 are synchronized at the beginning of a communication session. Symbol timing drift may also be caused by the remote transmitter 106 not using the symbol duration specified in standards.

As part of the process of receiving a signal 108, the receiver 114 of the wireless communication device 102 may generate a reference clock 120. The wireless communication device 102 may include a clock generation subsystem 116 that includes a reference clock generator 118 and a reference clock adjustment block 122.

The clock generation subsystem 116 may be part of an analog subsystem of the wireless communication device 102. The reference clock generator 118 may generate the reference clock 120. In one implementation, the reference clock generator 118 may be a phase-locked loop (PLL). In the case of NFC, the reference clock generator 118 may derive the reference clock 120 based on the received signal 108 from the remote device 104.

The reference clock 120 may be provided to a modem 126 to demodulate and decode packets included in the received signal 108. The receiver 114 of the wireless communication devices 102 may contain a time tracking block 128 that enables the receiver 114 to track drifting symbol timing caused by a mismatch between a remote transmitter clock and a receiver clock (i.e., the reference clock 120).

This time tracking block 128 may be implemented in a hardware form, rather than a software form, because of high computational complexity and stringent latency requirements. The time tracking block 128 may be designed to satisfy performance requirements (within defined margins) on a tolerable amount of symbol timing drift. The performance requirements of the time tracking block 128 may be based on standards and behaviors of remote transmitters (e.g., remote devices 104) in the market.

However, there are situations where the transmitters of remote devices 104 do not conform to the timing requirements specified by the standards. For example, some NFC readers may not conform to the NFC timing specifications. With these readers, a waveform that would represent a 1 or a 0 may end up being longer than what the specifications require. For each 0 and 1 that the remote device 104 transmits, the waveform would get longer. This waveform elongation may accumulate over the packet. At some point, the modem 126 of the wireless communication device 102 may lose track of where the 0 begins and where the 1 begins. Therefore, the packet sent by the remote device 104 may be demodulated incorrectly.

These non-standard remote devices 104 may fail to interoperate with a wireless communication device 102 because they cause severe symbol timing drift beyond the capability of the time tracking block 128. This problem may be especially pronounced in a field of communication technologies where a large number of products are in the market and proprietary air interfaces and protocols are widely used. Near-field communication is one such communication technology. Because modem 126 hardware cannot easily be changed once it is fabricated, there is a need to perform symbol time tracking using a method that can be implemented through a combination of software and hardware.

To resolve the problems caused by symbol timing drift, the symbol timing of the modem 126 of the wireless communication device 102 may be adjusted to align with the non-standard bit duration of the remote device 104. For example, the reference clock 120 of the wireless communication device 102 may be directly adjusted through a frequency trimming implementation (if supported) to slow down or speed up the reference clock 120 provided to the modem 126. Alternatively, one or more clock pulses may be added to or removed from the reference clock 120 through a clock multiplication/division implementation.

In one approach, the wireless communication device 102 may eliminate some part or all of the symbol timing drift from the signal 108 received from the remote device 104 by adjusting the reference clock 120 for the modem 126. This approach may consist of two aspects.

In a first aspect, the wireless communication device 102 may determine whether to eliminate an amount of symbol timing drift. The wireless communication device 102 may first determine whether the remote device 104 is a standard device with tolerable symbol timing drift or a non-standard device with intolerable symbol timing drift. For example, the wireless communication device 102 may determine whether the symbol timing drift of the remote device 104 complies with NFC standards.

In one configuration, the wireless communication device 102 may include a symbol timing drift elimination module 110. The symbol timing drift elimination module 110 may be implemented as a software module. For example, the symbol timing drift elimination module 110 may be implemented by a processor (e.g., central processing unit (CPU)).

The symbol timing drift elimination module 110 may determine whether the symbol timing drift is an intolerable symbol timing drift. For example, the symbol timing drift elimination module 110 may determine whether the amount of symbol timing drift of the signal 108 is greater than the amount of symbol timing drift that the time tracking block 128 can handle. If the remote device 104 is a normal device (e.g., a device where the symbol timing drift complies with the standards), no further reference clock 120 adjustment is performed.

In an implementation, if the modem 126 hardware supports estimation of symbol timing drift, then the symbol timing drift elimination module 110 can compare the symbol timing drift estimate 111 with the range of symbol timing drift that the time tracking block 128 can handle. This range may be determined at the time tracker design time (and known thereafter). In another implementation, if the modem 126 hardware does not support the estimation of symbol timing drift, then the symbol timing drift elimination module 110 may determine how often a packet is acquired but produces invalid decoded bits (i.e., CRC failure) to determine whether the amount of symbol timing drift of the signal 108 is greater than the amount of symbol timing drift that the time tracking block 128 can handle.

The symbol timing drift elimination module 110 may estimate the symbol timing drift. In one configuration, the amount of symbol timing drift may be estimated by modem 126 hardware. In another configuration, the amount of symbol timing drift may be determined by analyzing multiple signals such as an acquisition indicator, a packet validity indicator, demodulated bits and a carrier presence indicator. The analysis may be based on one packet or multiple previous packets, as described in connection with FIG. 4.

If the symbol timing drift elimination module 110 determines that the symbol timing drift of a received signal is greater than a tolerable amount for a time tracking block 128 of the modem 126, then the symbol timing drift elimination module 110 may determine a symbol timing drift elimination amount 112. For example, the symbol timing drift elimination module 110 may select an amount to adjust the reference clock 120 to bring the symbol timing drift into an amount that the time tracking block 128 can handle. In an implementation, the symbol timing drift elimination module 110 may use the symbol timing drift estimate 111 to determine the symbol timing drift elimination amount 112.

In one configuration, the symbol timing drift elimination amount 112 may be a frequency trim amount, which may increase or decrease the reference clock 120 by the frequency trim amount. In another configuration, the symbol timing drift elimination amount 112 may be a periodic clock frequency division or multiplication of the reference clock 120. These configurations are discussed further in connection with the second aspect of the symbol time tracking approach described herein.

In the second aspect of the symbol time tracking approach described herein, the wireless communication device 102 may eliminate part of or all of the symbol timing drift by adjusting a reference clock 120 for the modem 126. In a configuration, the wireless communication device 102 may perform a coarse correction where some of the excessive symbol timing drift is corrected. The remaining symbol timing drift may be corrected by the time tracking block 128 in hardware (e.g., fine correction). The coarse correction may be achieved by manipulating the reference clock 120 to produce an adjusted reference clock 124 for the modem 126.

In one implementation, the adjusted reference clock 124 may be produced by trimming the frequency of the reference clock 120. If the reference clock generator 118 supports frequency trimming (i.e., increasing or decreasing the reference clock 120 frequency), the amount of frequency trimming may be controlled by a register in the reference clock generator 118.

In one configuration, the frequency trim amount may be programmed based on the symbol timing drift estimate 111 determined by the symbol timing drift elimination module 110. In another configuration, the frequency trim amount may be a fixed frequency or fixed ratio. In other words, symbol timing drift elimination may be performed by increasing or decreasing the reference clock 120 by a fixed frequency or a fixed ratio to produce the adjusted reference clock 124.

The symbol timing drift elimination module 110 may provide the symbol timing drift elimination amount 112 in the form of a frequency trim amount to the reference clock generator 118. Upon receiving the frequency trim amount, the reference clock generator 118 may increase or decrease the reference clock 120 by the frequency trim amount.

The reference clock generator 118 may include a reference clock adjustment block 122 that produces the adjusted reference clock 124. In this case, the reference clock adjustment block 122 may increase or decrease the reference clock 120 by the frequency trim amount to produce the adjusted reference clock 124 that is provided to the modem 126.

In another implementation, the adjusted reference clock 124 may be produced by a periodic clock frequency division or multiplication of the reference clock 120. If the reference clock generator 118 does not support frequency trimming, the reference clock 120 may still be adjusted for coarse correction by dividing or multiplying the reference clock 120 in a periodic manner. For example, the reference clock 120 frequency may be decreased by periodically enabling clock division (i.e., periodic deletion of clock pulses). Similarly, the reference clock 120 frequency may be increased by periodically enabling clock multiplication (i.e., periodic insertion of clock pulses). This may be accomplished by turning on or off the clock division or multiplication feature (e.g., a clock multiplier/divider block). Therefore, when certain clock edges are eliminated, the average modem clock frequency will be reduced. When certain clock edges are added, the average modem clock frequency will be increased.

It should be noted that when the clock division/multiplication feature is turned on and off in a periodic manner, clock pulses are generated automatically. Furthermore, the wireless communication device 102 may turn on and off the clock division/multiplication feature, rather than the reference clock generator 118 itself.

As with frequency trimming, the clock division and/or multiplication may be controlled by a register. The symbol timing drift elimination module 110 may enable or disable the clock division and/or multiplication in the clock generation subsystem 116. In this case, the reference clock adjustment block 122 may perform the clock division and/or multiplication to produce the adjusted reference clock 124 that is provided to the modem 126.

In another implementation, if a reliable symbol timing drift estimate 111 is not feasible, a trial-and-error technique may be employed. The wireless communication device 102 may vary the amount of reference clock 120 adjustment until packets are acquired and demodulated successfully. In this approach, the wireless communication device 102 may try different amounts of symbol timing drift elimination until packets are acquired and demodulated without an error.

Because aspects of the systems and methods described herein can be implemented in software, the wireless communication device 102 may be updated with a software patch instead of a costly chip revision. Therefore, when non-standard remote devices 104 are encountered that do not interoperate with the receiver 114 of the wireless communication device 102, a solution may be provided via software instead of hardware changes.

Additionally, reference clock 120 frequency trimming provides additional benefits as an alternative method for implementing symbol timing correction. Compared with other methods of adjusting symbol timing in the modem 126, the frequency trimming approach described herein is performed in the analog subsystem. The frequency trimming approach may speed up the modem 126 design and digital verification processes because all the blocks in the modem 126 can assume a fixed symbol timing. In other words, the symbol timing correction may be performed by the analog subsystem (i.e., the reference clock generator 118) instead of the digital subsystem, freeing up resources for the digital subsystem.

Figure 2:
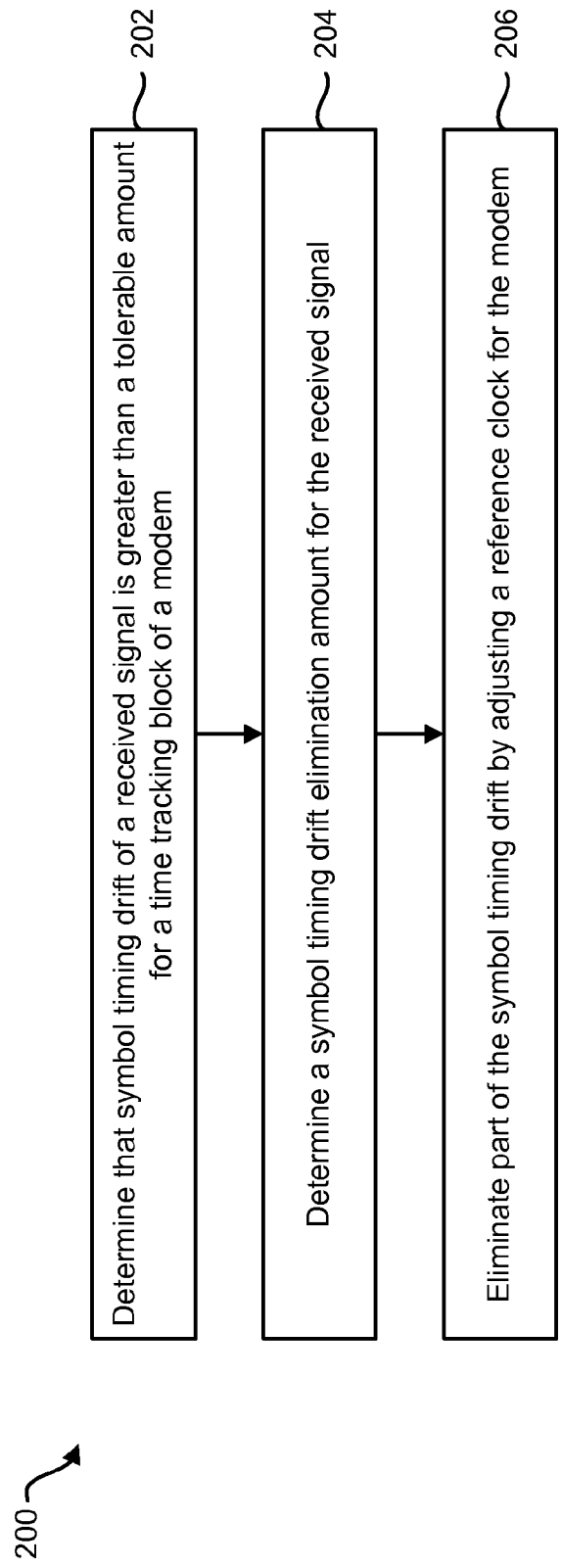
FIG. 2 is a flow diagram illustrating a method for symbol time tracking.

FIG. 2 is a flow diagram illustrating a method 200 for symbol time tracking. The method 200 may be performed by a wireless communication device 102. In one configuration, the wireless communication device 102 may be a target NFC device.

The wireless communication device 102 may receive a signal 108 from a remote device 104. The remote device 104 may be an initiator NFC device. The signal 108 may be experiencing symbol timing drift.

The wireless communication device 102 may determine 202 that the symbol timing drift is greater than a tolerable amount for a time tracking block 128 of the modem 126. If the symbol timing drift is greater than a tolerable amount for a time tracking block 128, then the time tracking block 128 may not be able to correct the symbol timing drift.

The wireless communication device 102 may determine a symbol timing drift estimate 111. In one configuration, the symbol timing drift estimate 111 may be determined by modem 126 hardware. In another configuration, the symbol timing drift estimate 111 may be determined by analyzing multiple signals such as an acquisition indicator, a packet validity indicator, demodulated bits and a carrier presence indicator. The analysis may be based on one packet or multiple previous packets. The wireless communication device 102 may determine 202 that the symbol timing drift is greater than a tolerable amount by comparing the symbol timing drift estimate 111 to a known amount of symbol timing drift that can be tolerated by the time tracking block 128.

The wireless communication device 102 may determine 204 a symbol timing drift elimination amount 112 for the received signal 108. The wireless communication device 102 may select the symbol timing drift elimination amount 112 based on the symbol timing drift estimate 111. For example, the wireless communication device 102 may set the symbol timing drift elimination amount 112 as the symbol timing drift estimate 111.

The wireless communication device 102 may eliminate 206 part of the symbol timing drift by adjusting a reference clock 120 for the modem 126. In one implementation, the wireless communication device 102 may adjust the reference clock 120 by frequency trimming. The wireless communication device 102 may increase or decrease the reference clock 120 by a frequency trim amount to produce the adjusted reference clock 124 that is provided to the modem 126. By increasing or decreasing the reference clock 120 frequency, the wireless communication device 102 may eliminate 206 at least part of or all of the symbol timing drift.

In one configuration, the frequency trim amount may be programmed based on the symbol timing drift estimate 111. In another configuration, the frequency trim amount may be a fixed frequency or fixed ratio. In this configuration, eliminating symbol timing drift may be accomplished by increasing or decreasing the reference clock 120 by a fixed frequency or a fixed ratio.

In another implementation, the wireless communication device 102 may eliminate 206 part of the symbol timing drift by clock multiplication or division. In this configuration, the wireless communication device 102 may periodically enable and disable clock division or multiplication for the reference clock 120. This may be done in a periodic manner. This may be accomplished by turning on or off the clock division or multiplication.

When performing clock division, clock edges may be eliminated from the reference clock 120. In this case, the average modem clock frequency will be reduced. When performing clock multiplication, clock edges may be added to the reference clock 120. In this case, the average modem clock frequency will be increased.

Figure 3:
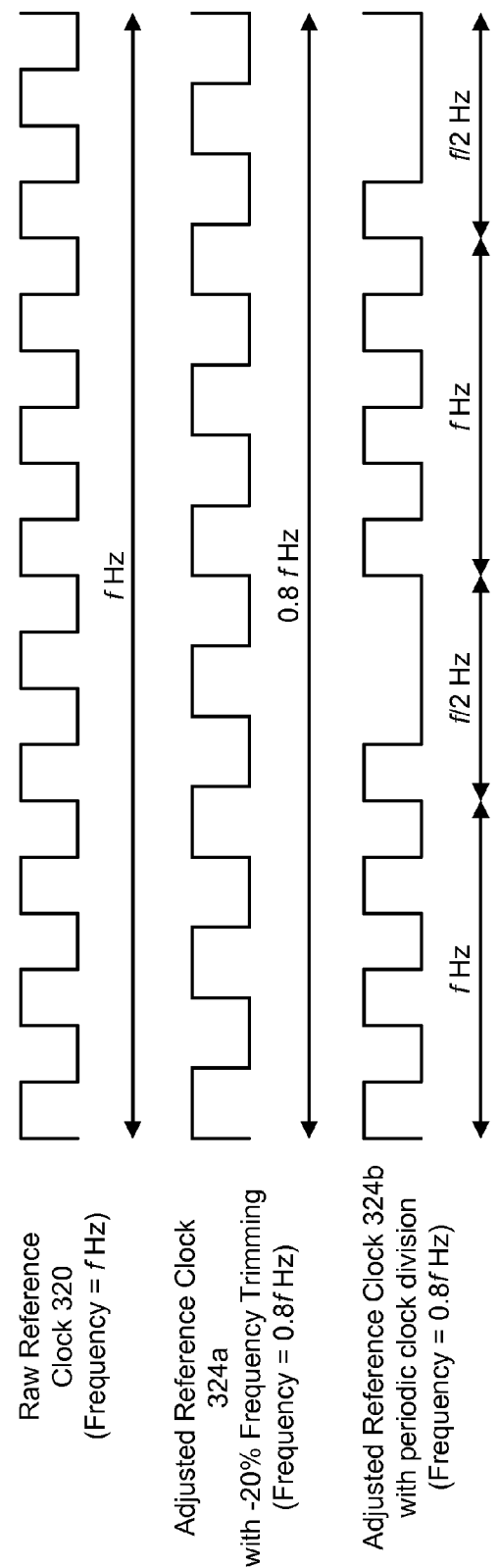
FIG. 3 shows examples of a reference clock and two adjusted reference clocks used for symbol time tracking through clock manipulation.

FIG. 3 shows examples of a raw reference clock 320 and two adjusted reference clocks 324 used for symbol time tracking through clock manipulation. The first waveform depicts a raw (e.g., un-adjusted) reference clock 320 with frequency f. The raw reference clock 320 may be obtained from a signal 108 transmitted by a remote device 104.

The raw reference clock 320 may be generated by a reference clock generator 118 of a wireless communication device 102. In this example, the symbol duration used by the remote device 104 is 25% longer than what is specified in the standards. Therefore, the wireless communication device 102 may align symbol timing by increasing the clock period by 25%. This may be accomplished by reducing the reference clock 320 frequency by 20%.

A second waveform depicts an example of the adjusted reference clock 324a according to the frequency trimming approach described above. In this example, the adjusted reference clock 324a has a frequency of 0.8 f. The adjusted reference clock 324a is produced by trimming 20% of the frequency of the raw reference clock 320. Therefore, the average reference clock 320 frequency is reduced by 20%. The second waveform shows 80% of the raw reference clock 320 by changing the clock frequency directly, which is referred to as frequency trimming.

The third waveform depicts an example of an adjusted reference clock 324b according to the clock division/multiplication approach described above. In this clock division example, a division-by-two feature is disabled for 3/f seconds, then is enabled for 2/f seconds, and the process is repeated. It should be noted that this example uses the same average clock frequency as the second waveform (e.g., the frequency trimming approach), but from time to time, certain clock pulses are eliminated. In this case, there are four clock pulses and one clock pulse is eliminated. The average reference clock 320 frequency becomes 80% of the raw reference clock 320.

Whether the frequency trimming approach (e.g., the second waveform) or the clock division/multiplication approach (e.g., the third waveform) is used depends on the analog part of the wireless communication device 102. If the reference clock generator 118 in the analog subsystem supports frequency trimming, then the frequency trimming approach may be used. But if the reference clock generator 118 in the analog subsystem does not support frequency trimming, then the clock division/multiplication approach may be used.

Figure 4:
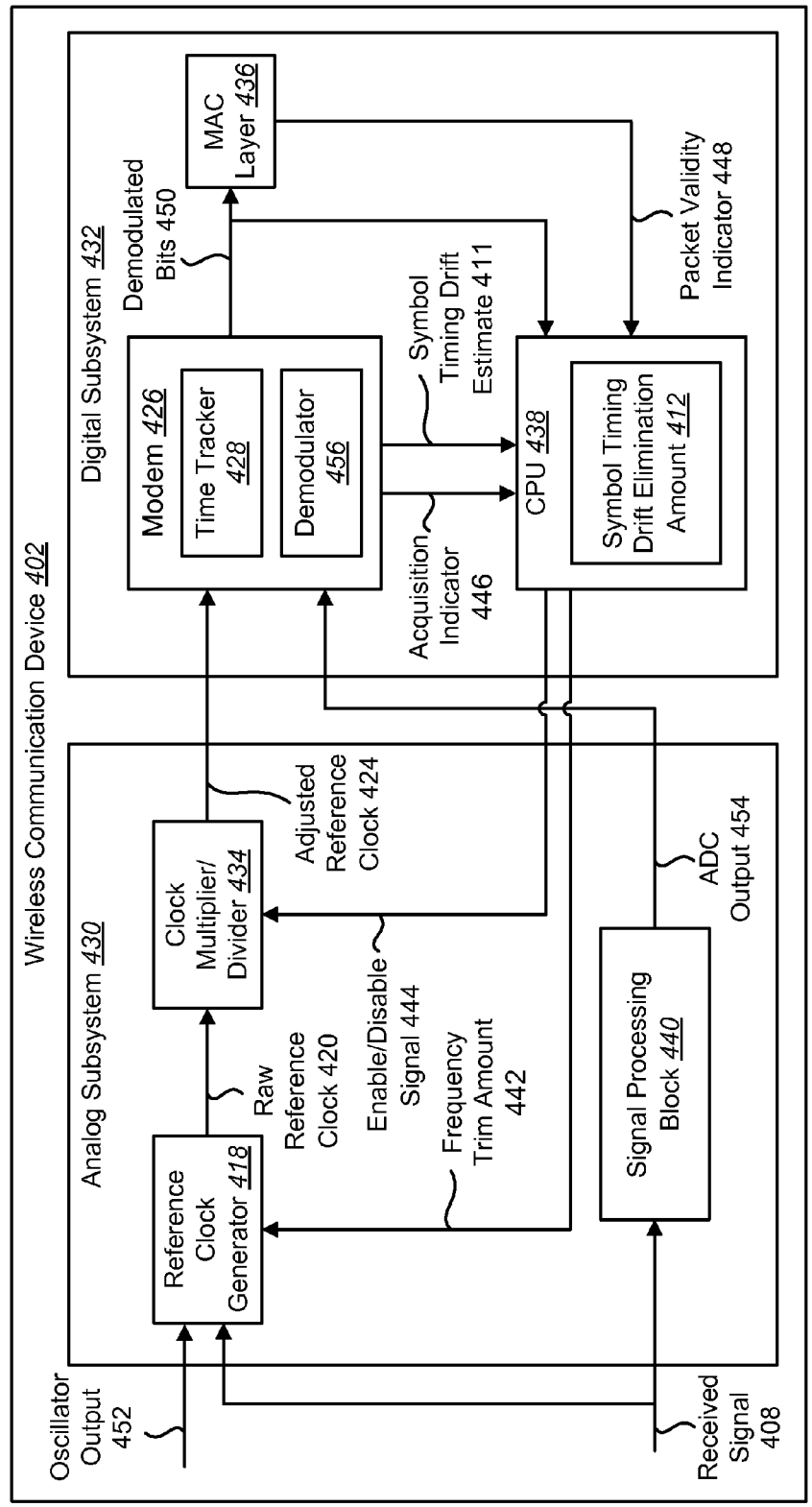
FIG. 4 shows an exemplary wireless communication device with receiver components and signals relevant to clock manipulation.

FIG. 4 shows an exemplary wireless communication device 402 with receiver 114 components and signals relevant to clock manipulation. In one configuration, the wireless communication device 402 may be an NFC device that communicates with a remote NFC device (not shown).

The wireless communication device 402 may include an analog subsystem 430 and a digital subsystem 432. Certain elements/blocks may be removed from or additional elements/blocks may be added to the system illustrated in FIG. 4. Furthermore, two or more elements/blocks may be combined into a single element/block, or a single element/block may be realized as multiple elements/blocks.

The analog subsystem 430 may include one or more of a signal processing block 440, a reference clock generator 418 and a clock multiplier/divider block 434. The signal processing block 440 may receive a signal 408 from the remote device 104 (not shown). The signal processing block 440 may include analog signal processing components (e.g., a low-noise amplifier (LNA), mixer, filters, and an analog-todigital converter (ADC)). The signal processing block 440 may provide the ADC output 454 to the modem 426 in the digital subsystem 432.

The reference clock generator 418 may produce a raw reference clock 420 based on the received signal 408 or an oscillator output 452. In one configuration, the reference clock generator 418 may derive the (synchronous) reference clock 420 using a phase-locked loop (PLL) that locks to the received signal 408 transmitted by the remote device 104. Alternatively, the wireless communication device 402 may use an asynchronous clocking technique that creates an asynchronous reference clock 420 based on a local oscillator output 452, not depending on the received signal 408.

In one implementation, the clock multiplier/divider block 434 may be included in the analog subsystem 430 (as shown in FIG. 4). In another implementation (not shown), the clock multiplier/divider block 434 may be implemented in the digital subsystem 432.

The digital subsystem 432 may include the modem 426, a media access control (MAC) layer 436 and a CPU 438. The modem 426 may include a time tracking block (time tracker) 428 that enables a receiver 114 to track drifting symbol timing caused by a mismatch between a remote transmitter clock and a receiver clock (i.e., the reference clock 420), or by the remote transmitter not using the symbol duration specified in standards. As described above, this time tracking block 428 may be implemented in a hardware form rather than software because of high computational complexity and stringent latency requirements.

The modem 426 may also include a demodulator 456 to produce demodulated bits 450. The modem 426 may receive the ADC output 454 and the adjusted reference clock 424 to produce the demodulated bits 450. The modem 426 may provide demodulated bits 450 to the MAC layer 436 and the CPU 438.

The modem 426 may also generate an acquisition indicator 446. If the modem 426 supports symbol timing drift estimation, the modem 426 may also generate the symbol timing drift estimate 411. The acquisition indicator 446, symbol timing drift estimate 411 and/or demodulated bits 450 may be provided to the CPU 438. The modem 426 may also include one or more of a slicer and an acquisition block (not shown).

The MAC layer 436 may receive the demodulated bits 450. Based on the demodulated bits 450, the MAC layer 436 may determine whether a packet is valid. The MAC layer 436 may provide a packet validity indicator 448 to the CPU 438.

The CPU 438 may select the symbol timing drift elimination amount 412 based on the symbol timing drift estimate 411, the symbol timing error, the packet acquisition indicator 446, the demodulated bits 450, the packet validity indicator 448, or a carrier presence indicator. Symbol timing error may be determined in many ways. One way is using a matched filter (e.g., a filter whose coefficients are matched to a modulation waveform) and comparing an on-time sample with an early and a late sample. The relationship between these values is related to symbol timing error. Carrier presence can be determined by monitoring the signal envelope or signal power in the analog subsystem.

Upon receiving a signal 408 from the remote device 104, the CPU 438 may detect whether the symbol timing drift is greater than a tolerable amount for a time tracking block 428 of the modem 426 by running a detection/estimation algorithm. The detection/estimation of symbol timing drift may be performed by the CPU 438 in various ways. In the digital subsystem 432, the detection can be based on one or a combination of the acquisition indicator 446, symbol timing drift estimate 411, demodulated bits 450, or packet validity indicator 448. By looking at these various parameters, the CPU 438 can implement the detection/estimation algorithm. For example, the CPU 438 may determine how often a packet is acquired, but the packet is invalid. If a cyclic redundancy check (CRC) fails, for example, the CPU 438 knows that there is a packet, but the packet was not decoded correctly. This may be because of symbol timing drift.

In a first example of symbol timing drift detection/estimation, if a packet is acquired but demodulated incorrectly N times (where N may be a positive integer) within T seconds, the CPU 438 may select a predetermined amount of symbol timing error correction. Alternatively, the CPU 438 may select a sequence of a predetermined amount of symbol timing error correction until a packet that failed previously is acquired and demodulated successfully.

In a second example of symbol timing drift detection, when determining whether a bit duration is elongated or shortened, the CPU 438 may compare demodulated bits 450 to known NFC packets. In this example, if a packet is acquired but demodulated incorrectly, the CPU 438 may estimate the symbol timing drift rate based on the bit index of the first incorrectly demodulated bit 450 in the received packet, and/or based on the comparison of the demodulated bits 450 with demodulated bits 450 that are expected for the positive symbol timing drift case and those for the negative symbol timing drift case. In the case of NFC, this technique is possible because the first few packets are predetermined by standards, either the entire bits of a packet or the beginning part of a packet. In this example, the CPU 438 may use the result of the comparison to determine whether to slow down or speed up the reference clock 420.

Upon selecting the symbol timing drift elimination amount 412, the CPU 438 may send signals to the reference clock generator 418 and clock multiplier/divider block 434 to eliminate part of or all of the symbol timing drift. Registers for clock frequency trimming and for clock division/multiplication may be programmed by CPU 438 (as shown in FIG. 4) or by hardware (not shown).

In a configuration where the wireless communication device 402 supports frequency trimming (i.e., increasing or decreasing the reference clock 420 frequency), the CPU 438 may send a frequency trim amount 442 to the reference clock generator 418, which may apply the frequency trim amount 442 to the generated reference clock 420. In this case, the raw reference clock 420 is the adjusted reference clock 424 that is provided to the modem 426.

In another configuration (where the wireless communication device 402 does not support frequency trimming), the CPU 438 may instead periodically enable or disable clock division or multiplication for the reference clock 420. In this configuration, the CPU 438 may send an enable/disable signal 444 to enable or disable the clock multiplier/divider block 434. When the clock multiplier/divider block 434 is disabled, the raw reference clock 420 is unmodified. When the clock multiplier/divider block 434 is enabled, the raw reference clock 420 may be adjusted by adding or removing clock pulses (as described in connection with FIG. 3).

Figure 5:
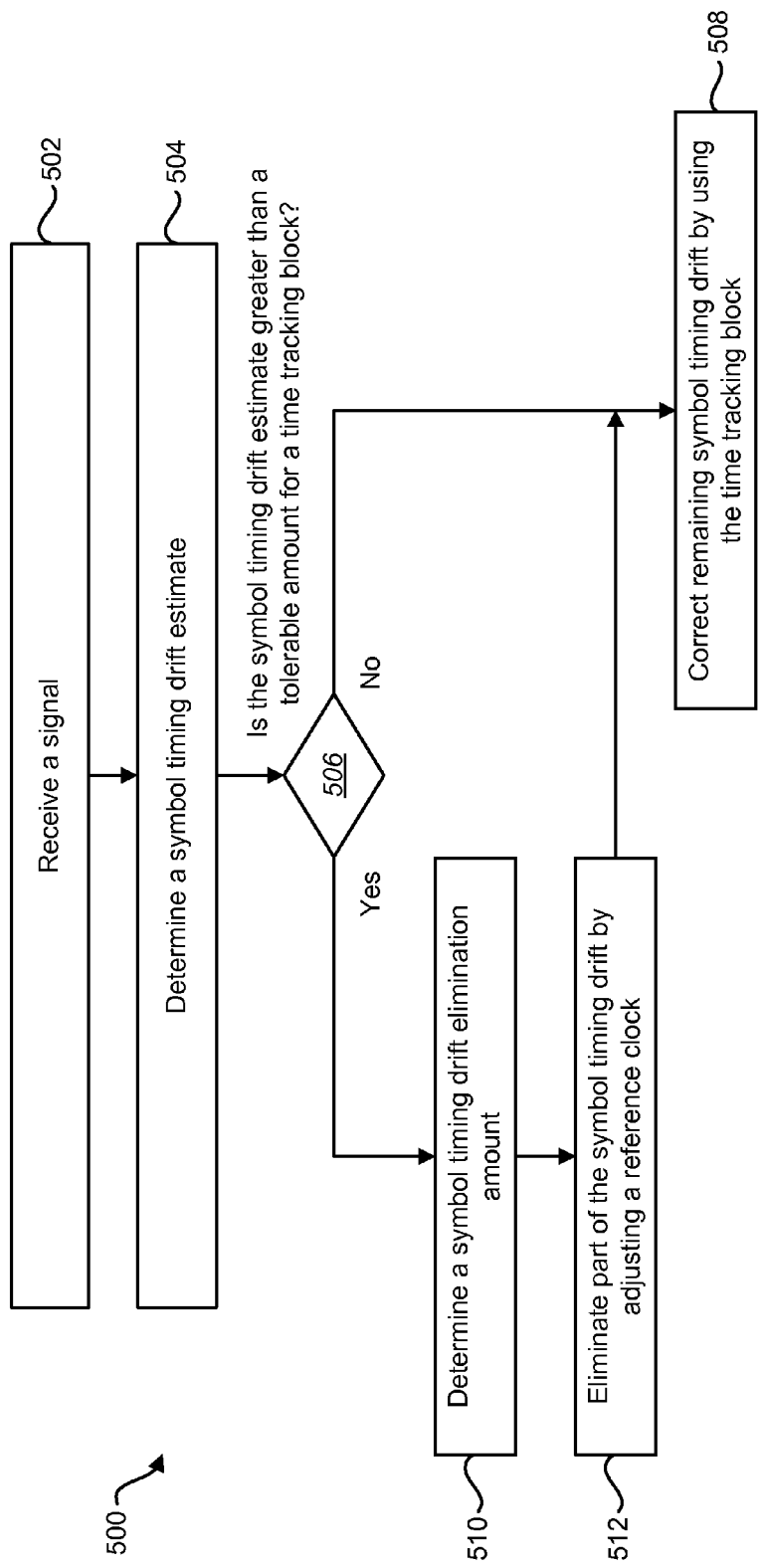
FIG. 5 is a flow diagram illustrating a detailed method for symbol time tracking.

FIG. 5 is a flow diagram illustrating a detailed method 500 for symbol time tracking. The method 500 may be performed by a wireless communication device 402. In one configuration, the wireless communication device 402 may be a target NFC device.

The wireless communication device 402 may receive 502 a signal 408 from a remote device 104. The remote device 104 may be an initiator NFC device (e.g., NFC reader).

The wireless communication device 402 may determine 504 a symbol timing drift estimate 411. In one configuration, the symbol timing drift estimate 411 may be determined by modem 426 hardware. In another configuration, the symbol timing drift estimate 411 may be determined by a CPU 438. For example, the CPU 438 may analyze one or more parameters such as an acquisition indicator 446, a packet validity indicator 448, demodulated bits 450 and a carrier presence indicator. The analysis may be based on one packet or multiple previous packets received in the signal 408.

The wireless communication device 402 may determine 506 whether the symbol timing drift is greater than a tolerable amount for a time tracking block 428 of the modem 426. For example, the wireless communication device 402 may compare the symbol timing drift estimate 411 with a known tolerable amount of symbol timing drift for the time tracking block 428.

If the wireless communication device 402 determines 506 that the symbol timing drift is not greater than a tolerable amount for a time tracking block 428 of the modem 426, then the wireless communication device 402 may correct 508 remaining symbol timing drift by the time tracking block 428. In this case, the symbol timing drift is small enough to be eliminated by the time tracking block 428.

If the symbol timing drift is greater than a tolerable amount for a time tracking block 428, then the time tracking block 428 may not be able to correct the symbol timing drift. The wireless communication device 402 may determine 510 a symbol timing drift elimination amount 412. For example, the wireless communication device 402 may set the symbol timing drift elimination amount 412 as the symbol timing drift estimate 411. In one implementation, the symbol timing drift elimination amount 412 may be a frequency trim amount 442. In another implementation, the symbol timing drift elimination amount 412 may be an amount of clock multiplication or division.

The wireless communication device 402 may eliminate 512 part of the symbol timing drift by adjusting a reference clock 420 for the modem 426. In one implementation, the wireless communication device 402 may adjust the reference clock 420 by frequency trimming. The wireless communication device 402 may increase or decrease the reference clock 120 by a frequency trim amount 442 to produce the adjusted reference clock 424 that is provided to the modem 426. For example, the CPU 438 may provide the frequency trim amount 442 to a reference clock generator 418, which may increase or decrease the reference clock 420. By increasing or decreasing the reference clock 420 frequency, the wireless communication device 402 may eliminate 512 part of the symbol timing drift.

In one configuration, the frequency trim amount 442 may be programmed based on the symbol timing drift estimate 411 determined by the CPU 438. In another configuration, the frequency trim amount 442 may be a fixed frequency or fixed ratio. In this configuration, eliminating symbol timing drift may be accomplished by increasing or decreasing the reference clock 420 by a fixed frequency or a fixed ratio.

In another implementation, the wireless communication device 402 may eliminate 512 part of the symbol timing drift by clock multiplication or division. In this configuration, the wireless communication device 402 may periodically enable and disable clock division or multiplication for the reference clock 420. This may be done in a periodic manner. For example, the CPU 438 may send an enable/disable signal 444 to a clock multiplier/divider 434 to enable or disable the clock division or multiplication.

Upon eliminating 512 part of the symbol timing drift by adjusting the reference clock 420, the wireless communication device 402 may correct 508 remaining symbol timing drift by using the time tracking block 428. Therefore, the wireless communication device 402 may perform a coarse correction of the symbol timing drift by adjusting the reference clock 420. The wireless communication device 402 may then perform a fine correction of the symbol timing drift by using the time tracking block 428.

Figure 6:
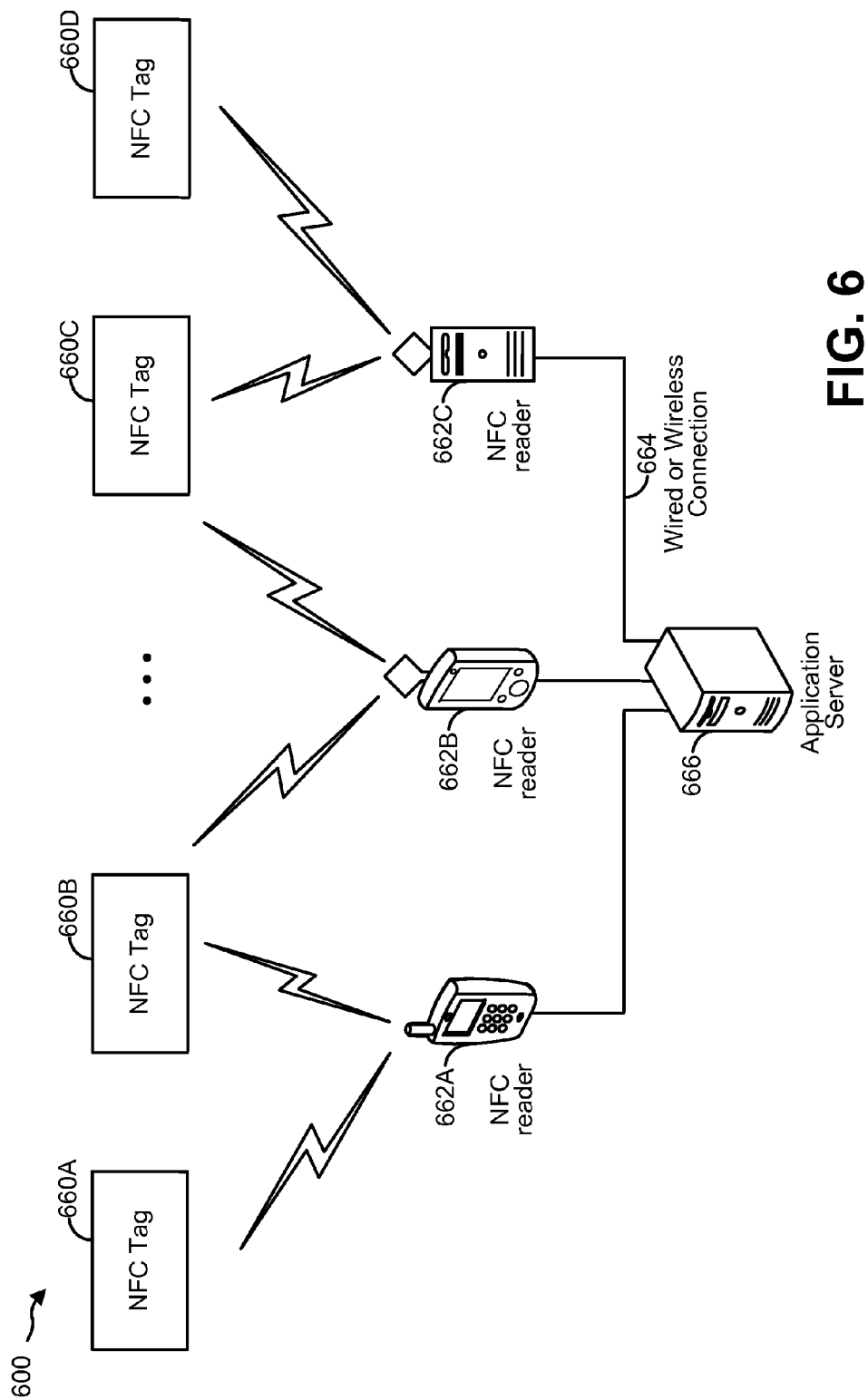
FIG. 6 is a block diagram illustrating a near-field communication (NFC) system.

FIG. 6 is a block diagram illustrating an NFC system 600. The NFC system 600 includes a plurality of NFC tags 660A-660D, a plurality of NFC readers 662A-662C and an application server 666.

The NFC tags 660A-660D may each be associated with a particular object for a variety of purposes including, but not limited to, tracking inventory, tracking status, location determination and assembly progress. The NFC tags 660A-660D may be active devices that include internal power sources or passive devices that derive power from the NFC readers 662A-662C.

Although FIG. 6 shows only four NFC tags 660A-660D and three NFC readers 662A-662C, the present disclosure is not limited thereto. In one configuration, the NFC tags 660A-660D may be implemented in accordance with the wireless communication device 102 described in connection with FIG. 1. In one configuration, the readers 662A-662C may be implemented in accordance with the remote device 104 described in connection with FIG. 1.

Each NFC reader 662A-662C wirelessly communicates data with one or more NFC tags 660A-660D within its coverage area. For example, the NFC tags 660A and 660B may be within a coverage area of the NFC reader 662A, the NFC tags 660B and 660C may be within a coverage area of the NFC reader 662B, and the NFC tags 660C and 660D may be within a coverage area of the NFC reader 662C. In one configuration, the RF communication mechanism between the NFC readers 662A-662C and the NFC tags 660A-660D is a backscatter technique. In this configuration, the NFC readers 662A-662C request data from the NFC tags 660A-660D via an RF signal, and the RF tags 660A-660D respond with the requested data by modulating and backscattering the RF signal provided by the NFC readers 662A-662C.

In another configuration, the RF communication mechanism is an inductance technique whereby the NFC readers 662A-662C magnetically couple to the NFC tags 660A-660D via an RF signal to access the data on the NFC tags 660A-660D. In either configuration, the NFC tags 660A-660D provide the requested data to the NFC readers 662A-662C on the same RF carrier frequency as the RF signal.

In this manner, the NFC readers 662A-662C collect data from each of the NFC tags 660A-660D within its coverage area. The collected data is then conveyed to the application server 666 via a wired or wireless connection 664 and/or via possible communication mechanism, for example, a peer-to-peer communication connection. In addition, and/or in the alternative, the application server 666 may provide data to one or more of the NFC tags 660A-660D via the associated NFC readers 662A-662C. Such downloaded information is application dependent and may vary greatly. Upon receiving the downloaded data, the NFC tag 660 can store the data in a non-volatile memory therein.

In another configuration, the NFC readers 662A-662C may optionally communicate data on a peer-to-peer basis such that each NFC reader 662 does not need a separate wired or wireless connection 664 to the application server 666. For example, the NFC reader 662A and the NFC reader 662B may communicate on a peer-to-peer basis utilizing a back scatter technique, a WLAN technique, and/or any other wireless communication technique. In this instance, the NFC reader 662B may not include a wired or wireless connection 664 to the application server 666. In configurations in which communications between the NFC reader 662A-662C and the application server 666 are conveyed through the wired or wireless connection 664, the wired or wireless connection 664 may utilize any one of a plurality of wired standards (e.g., Ethernet and fire wire) and/or wireless communication standards (e.g., IEEE 802.11x and Bluetooth).

As one of ordinary skill in the art will appreciate, the NFC system of FIG. 6 may be expanded to include a multitude of NFC readers 662A-662C distributed throughout a desired location (for example, a building or office site) where the NFC tags 660 may be associated with equipment, inventory and/or personnel. In addition, it should be noted that the application server 666 may be coupled to another server and/or network connection to provide wide area network coverage.

Figure 7:
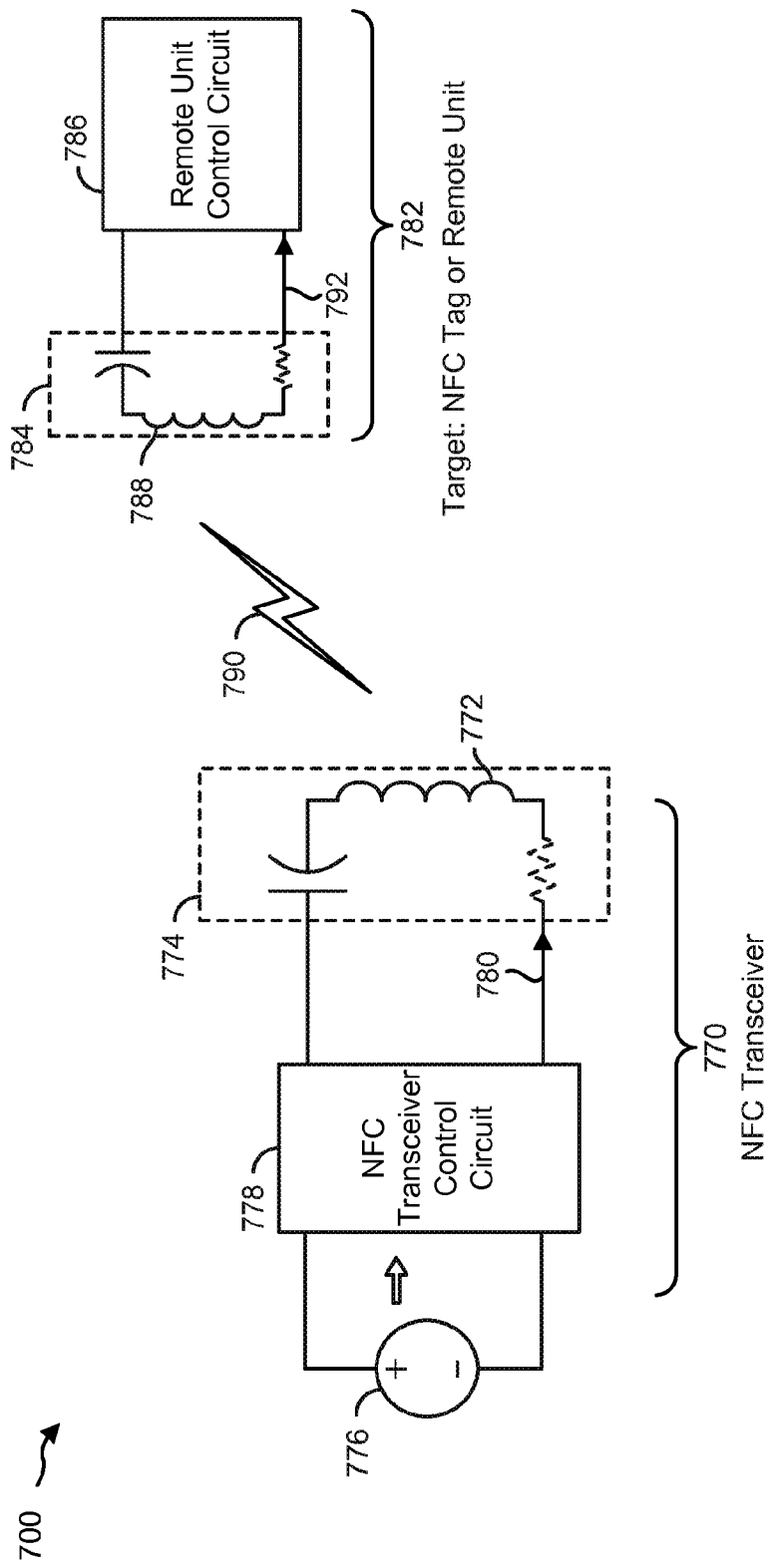
FIG. 7 is a block diagram illustrating an exemplary schematic of an NFC system including a transceiver and a remote unit.

FIG. 7 is a block diagram illustrating an exemplary schematic of an NFC system 700 including a transceiver and a remote unit. The NFC system 700 includes an NFC transceiver 770 and a remote unit 782 such as an NFC tag. The NFC transceiver 770 may include a voltage power source 776, an NFC transceiver control circuit 778 and a transmitter circuit 774. The NFC transceiver control circuit 778 is powered by the voltage source 766, and connected to one or more transceiver loops 772.

The transceiver loops 772 are hereinafter interchangeably used with coils or loop antennae. The coils and loop antenna may be made of conductive material, for example, an electromagnetic coil, through which an alternating current (AC) 780 can flow. The transceiver loops 772 may be circular, oval, and the like, although other sizes and shapes are possible. The AC current 780 flowing through the transceiver loops 772 can result in transmitting magnetic energy or magnetic flux 790 at various frequencies (e.g., about 100 kHz to about 40 MHz). The wavelength of the emitted frequencies may be much longer than the size of loops 772 on the NFC transceiver 770.

The remote unit 782 includes a receiver circuit 784 and a remote unit control circuit 786. If the remote unit 782 is close enough to the NFC transceiver 770, the magnetic flux 790 from the transceiver 770 can get AC coupled onto one or more remote unit loops 788 of conductive material, which can be an unpowered device (i.e., without a battery or other means of applying continuous power) having the electromagnetic coil and remote unit control circuit 786. An oscillating AC current 792 flowing in alternating directions in the remote unit control circuit 786 can be rectified by a rectifying diode in the remote unit control circuit 786, which can cause a voltage to be built up across a bypass capacitor in the remote unit control circuit 786. Once the bypass capacitor has built up a sufficient voltage, the remote unit control circuit 786 can become powered up and operational. By receiving the coupled and modulated AC signal from the NFC transceiver 770, the remote unit 782 can receive and detect information (e.g., commands) from the NFC transceiver 770.

Once operational, the remote unit control circuit 786 may also send signals back to the NFC transceiver 770 by changing the impedance seen by the remote unit loops 788. This can be accomplished by shunting or opening the remote unit loops 788 with, for example, a switch. If the remote unit 782 is close enough to the NFC transceiver 770, the modulated electromagnetic field generated by the remote unit loops 788 in the remote unit 782 can be coupled back onto the reader loops 772 of the NFC transceiver 770. The signals sent back to the NFC transceiver 770 can be slow and on the order of 100 bits of data, and provide information back to the transceiver 770 such as the serial number or model number of the device to which the remote unit 782 is attached, credit card number, personal identification information, security codes and passwords, and the like.

Figure 8:
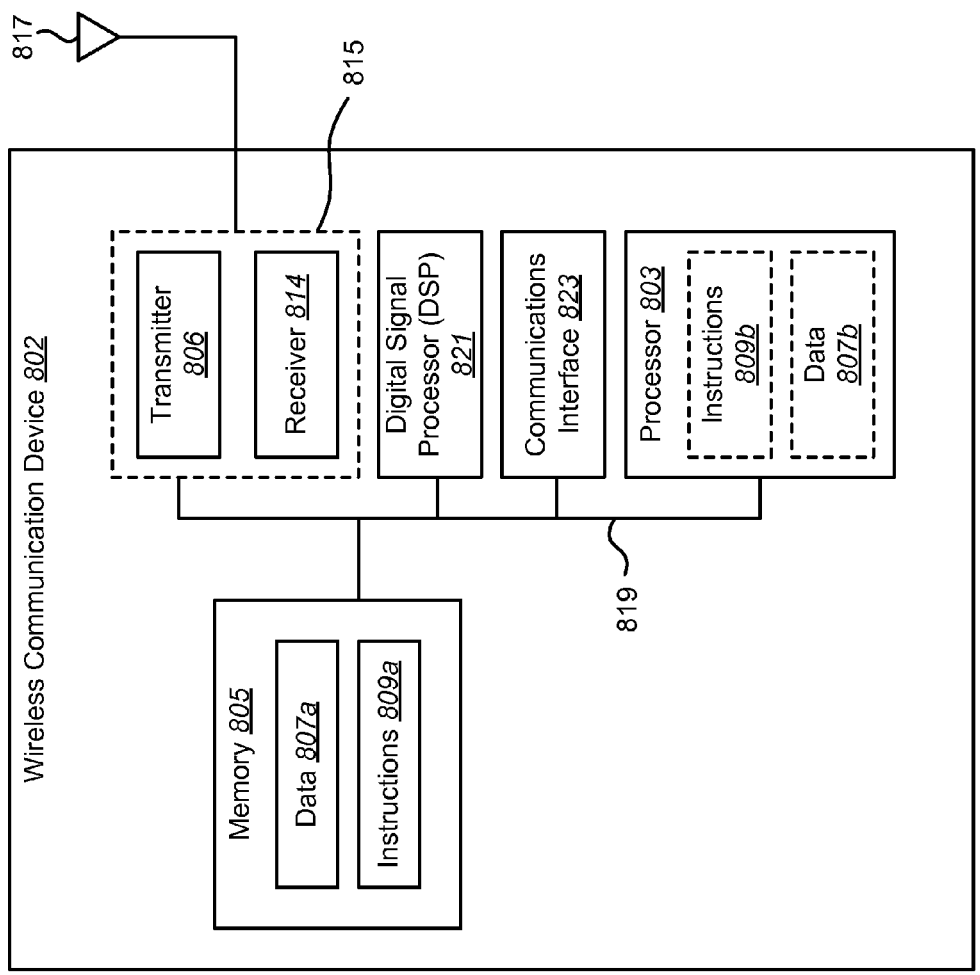
FIG. 8 illustrates certain components that may be included within a wireless communication device.

FIG. 8 illustrates certain components that may be included within a wireless communication device 802. The wireless communication device 802 may be a wireless device, an access terminal, a mobile station, a user equipment (UE), a laptop computer, a desktop computer, etc. For example, the wireless communication device 802 of FIG. 8 may be implemented in accordance with the wireless communication device 102 of FIG. 1.

The wireless communication device 802 includes a processor 803. The processor 803 may be a general purpose single- or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 803 may be referred to as a central processing unit (CPU). Although just a single processor 803 is shown in the wireless communication device 802 of FIG. 8, in an alternative configuration, a combination of processors (e.g., an ARM and DSP) could be used.

The wireless communication device 802 also includes memory 805 in electronic communication with the processor 803 (i.e., the processor can read information from and/or write information to the memory). The memory 805 may be any electronic component capable of storing electronic information. The memory 805 may be configured as random access memory (RAM), read-only memory (ROM), magnetic disk storage media, optical storage media, flash memory devices in RAM, on-board memory included with the processor, EPROM memory, EEPROM memory, registers and so forth, including combinations thereof.

Data 807a and instructions 809a may be stored in the memory 805. The instructions 809a may include one or more programs, routines, sub-routines, functions, procedures, code, etc. The instructions 809a may include a single computer-readable statement or many computer-readable statements. The instructions 809a may be executable by the processor 803 to implement the methods disclosed herein. Executing the instructions 809a may involve the use of the data 807a that is stored in the memory 805. When the processor 803 executes the instructions 809a, various portions of the instructions 809b may be loaded onto the processor 803, and various pieces of data 807b may be loaded onto the processor 803.

The wireless communication device 802 may also include a transmitter 806 and a receiver 814 to allow transmission and reception of signals to and from the wireless communication device 802 via an antenna 817. The transmitter 806 and receiver 814 may be collectively referred to as a transceiver 815. The wireless communication device 802 may also include (not shown) multiple transmitters, multiple antennas, multiple receivers and/or multiple transceivers.

The wireless communication device 802 may include a digital signal processor (DSP) 821. The wireless communication device 802 may also include a communications interface 823. The communications interface 823 may allow a user to interact with the wireless communication device 802.

The various components of the wireless communication device 802 may be coupled together by one or more buses, which may include a power bus, a control signal bus, a status signal bus, a data bus, etc. For the sake of clarity, the various buses are illustrated in FIG. 8 as a bus system 819.

In the above description, reference numbers have sometimes been used in connection with various terms. Where a term is used in connection with a reference number, this may be meant to refer to a specific element that is shown in one or more of the Figures. Where a term is used without a reference number, this may be meant to refer generally to the term without limitation to any particular Figure.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a digital signal processor (DSP) and a microprocessor, a plurality of microprocessors, one or more microprocessors in conjunction with a digital signal processor (DSP) core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may comprise a single computer-readable statement or many computer-readable statements.

The functions described herein may be implemented in software or firmware being executed by hardware. The functions may be stored as one or more instructions on a computer-readable medium. The terms "computer-readable medium" or "computer-program product" refers to any tangible storage medium that can be accessed by a computer or a processor. By way of example, and not limitation, a computer-readable medium may include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, such as those illustrated by FIG. 2 and FIG. 5, can be downloaded and/or otherwise obtained by a device. For example, a device may be coupled to a server to facilitate the transfer of means for performing the methods described herein. Alternatively, various methods described herein can be provided via a storage means (e.g., random access memory (RAM), read only memory (ROM), a physical storage medium such as a compact disc (CD) or floppy disk, etc.), such that a device may obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for communications, comprising:
   determining a symbol timing drift elimination amount for a received signal based on a comparison of demodulated bits with demodulated bits expected for a positive symbol timing drift case and demodulated bits expected for a negative symbol timing drift case; and
   eliminating part of a symbol timing drift based on the symbol timing drift elimination amount by adjusting a reference clock for a modem.

2. The method of claim 1, wherein determining the symbol timing drift elimination amount is further based on at least one of a symbol timing drift estimate, a symbol timing error, a packet acquisition indicator, a packet validity indicator, and a carrier presence indicator.

3. The method of claim 1, wherein determining the symbol timing drift elimination amount comprises trying different amounts of symbol timing drift elimination until packets are acquired and demodulated without an error.

4. The method of claim 1, wherein eliminating part of the symbol timing drift comprises increasing or decreasing the reference clock by a fixed frequency or a fixed ratio.

5. The method of claim 1, wherein eliminating part of the symbol timing drift comprises periodically enabling and disabling clock division or multiplication for the reference clock.

6. The method of claim 1, wherein adjusting the reference clock for the modem is performed in an analog block of a receiver.

7. The method of claim 1, wherein the method is performed by a near-field communication (NFC) device, and wherein a reference for the reference clock is obtained from a field transmitted by a remote NFC device.

8. A method for communication, comprising:
determining a symbol timing drift elimination amount for a received signal;
determining a symbol timing drift estimate of the received signal;
determining that the symbol timing drift estimate is greater than a tolerable amount for a time tracking block of a modem;
setting the symbol timing drift elimination amount based on the symbol timing drift estimate; and
eliminating part of a symbol timing drift by adjusting a reference clock for the modem.

9. A wireless communication device, comprising:
a processor;
a memory in communication with the processor; and
instructions stored in the memory, the instructions executable by the processor to:
determine a symbol timing drift elimination amount for a received signal based on a comparison of demodulated bits with demodulated bits expected for a positive symbol timing drift case and demodulated bits expected for a negative symbol timing drift case; and
eliminate part of a symbol timing drift based on the symbol timing drift elimination amount by adjusting a reference clock for a modem.

10. The wireless communication device of claim 9, wherein determining the symbol timing drift elimination amount is further based on at least one of a symbol timing drift estimate, a symbol timing error, a packet acquisition indicator, a packet validity indicator, and a carrier presence indicator.

11. The wireless communication device of claim 9, wherein the instructions executable to determine the symbol timing drift elimination amount comprise instructions executable to try different amounts of symbol timing drift elimination until packets are acquired and demodulated without an error.

12. The wireless communication device of claim 9, wherein the instructions executable to eliminate part of the symbol timing drift comprise instructions executable to increase or decrease the reference clock by a fixed frequency or a fixed ratio.

13. The wireless communication device of claim 9, wherein the instructions executable to eliminate part of the symbol timing drift comprise instructions executable to periodically enable and disable clock division or multiplication for the reference clock.

14. A wireless communication device, comprising:
a processor;
a memory in communication with the processor; and
instructions stored in the memory, the instructions executable by the processor to:
determine a symbol timing drift elimination amount for a received signal;
determine a symbol timing drift estimate of the received signal;
determine that the symbol timing drift estimate is greater than a tolerable amount for a time tracking block of a modem;
set the symbol timing drift elimination amount based on the symbol timing drift estimate; and
eliminate part of a symbol timing drift by adjusting a reference clock for the modem.

15. A computer-program product for communications, the computer-program product comprising a non-transitory computer-readable medium having instructions thereon, the instructions comprising:
code for causing a computer to determine a symbol timing drift elimination amount for a received signal based on a comparison of demodulated bits with demodulated bits expected for a positive symbol timing drift case and demodulated bits expected for a negative symbol timing drift case; and
code for causing the computer to eliminate part of a symbol timing drift based on the symbol timing drift elimination amount by adjusting a reference clock for a modem.

16. The computer-program product of claim 15, wherein the code for causing the computer to determine the symbol timing drift elimination amount is further based on at least one of a symbol timing drift estimate, a symbol timing error, a packet acquisition indicator, a packet validity indicator, and a carrier presence indicator.

17. The computer-program product of claim 15, wherein the code for causing the computer to determine the symbol timing drift elimination amount comprises code for causing the computer to try different amounts of symbol timing drift elimination until packets are acquired and demodulated without an error.

18. The computer-program product of claim 15, wherein the code for causing the computer to eliminate part of the symbol timing drift comprises code for causing the computer to increase or decrease the reference clock by a fixed frequency or a fixed ratio.

19. The computer-program product of claim 15, wherein the code for causing the computer to eliminate part of the symbol timing drift comprises code for causing the computer to periodically enable and disable clock division or multiplication for the reference clock.

20. A computer-program product for communications, the computer-program product comprising a non-transitory computer-readable medium having instructions thereon, the instructions comprising:
code for causing a computer to determine a symbol timing drift elimination amount for a received signal;
code for causing the computer to determine a symbol timing drift estimate of the received signal;
code for causing the computer to determine that the symbol timing drift estimate is greater than a tolerable amount for a time tracking block of a modem;
code for causing the computer to set the symbol timing drift elimination amount based on the symbol timing drift estimate; and code for causing the computer to eliminate part of a symbol timing drift by adjusting a reference clock for the modem.

* * * * *